United States Patent
Kil et al.

(10) Patent No.: US 7,676,379 B2
(45) Date of Patent: Mar. 9, 2010

(54) SYSTEM AND METHOD FOR AUTOMATED EXTRACTION AND DISPLAY OF PAST HEALTH CARE USE TO AID IN PREDICTING FUTURE HEALTH STATUS

(75) Inventors: David H. Kil, Prospect, KY (US); Marlene A. Sigwalt, Louisville, KY (US); Sandy S. Chiu, Louisville, KY (US); David B. Pottschmidt, New Albany, IN (US)

(73) Assignee: Humana Inc., Louisville, KY (US)

( * ) Notice: Subject to any disclaimer, the term of this patent is extended or adjusted under 35 U.S.C. 154(b) by 1681 days.

(21) Appl. No.: 10/832,915

(22) Filed: Apr. 27, 2004

(65) Prior Publication Data

US 2005/0240447 A1   Oct. 27, 2005

(51) Int. Cl.
  *G06Q 40/00* (2006.01)
(52) U.S. Cl. ............. 705/2; 705/3; 705/4; 707/102; 702/20; 600/300; 283/54; 340/870.07
(58) Field of Classification Search .......... 707/102; 705/2, 3, 4; 702/20; 600/300; 283/54
  See application file for complete search history.

(56) References Cited

U.S. PATENT DOCUMENTS

| | | | | |
|---|---|---|---|---|
| 5,018,067 A | * | 5/1991 | Mohlenbrock et al. | 600/300 |
| 5,225,976 A | * | 7/1993 | Tawil | 705/2 |
| 5,253,164 A | * | 10/1993 | Holloway et al. | 705/2 |
| 5,301,105 A | * | 4/1994 | Cummings, Jr. | 705/2 |
| 5,307,262 A | * | 4/1994 | Ertel | 705/2 |
| 5,324,077 A | * | 6/1994 | Kessler et al. | 283/54 |
| 5,835,897 A | * | 11/1998 | Dang | 705/2 |
| 5,970,463 A | * | 10/1999 | Cave et al. | 705/3 |
| 6,059,724 A | | 5/2000 | Campbell et al. | |
| 6,110,109 A | | 8/2000 | Hu et al. | |
| 6,453,297 B1 | * | 9/2002 | Burks et al. | 705/3 |
| 6,915,265 B1 | * | 7/2005 | Johnson | 705/2 |
| 2002/0026332 A1 | * | 2/2002 | Snowden et al. | 705/3 |

(Continued)

OTHER PUBLICATIONS

International Search Report, Form PCT/ISA/210, 2 pages, for International Application No. PCT/US05/14350 completed on Oct. 2, 2006 and mailed Jan. 26, 2007.

*Primary Examiner*—C. Luke Gilligan
*Assistant Examiner*—Dilek B Cobanoglu
(74) *Attorney, Agent, or Firm*—James C. Evans, Jr.; Greenebaum Doll & McDonald PLLC (57) ABSTRACT

The present invention relates to a system and method for automated extraction and display of past health care use to aid in predicting future health status. A system and method that converts raw medical and pharmacy claims data into Hierarchical Major Clinical Condition (HMCC) and Place of Treatment (POT) time-series data to facilitate the health assessment of a member's total clinical conditions and aid in predicting his or her future health status. The HMCC categories are organized in body systems and likely disease progression to permit both spatio-temporal digital signal processing and the development of a dynamical learning system. Each medical and pharmacy claim of the member is mapped onto one or more HMCC/POT-time cells. At the end of mapping, multiple entries in each HMCC-time cell are accumulated with the temporal resolution determined as a function of group size and temporal fidelity required for model building.

18 Claims, 5 Drawing Sheets

U.S. PATENT DOCUMENTS

2002/0116387 A1* 8/2002 Farahmand et al. ......... 707/102
2002/0161609 A1* 10/2002 Zizzamia et al. ............... 705/4
2003/0120515 A1* 6/2003 Geller ........................... 705/2
2003/0187592 A1* 10/2003 Ohta et al. .................... 702/20

* cited by examiner

SYSTEM AND METHOD FOR AUTOMATED EXTRACTION AND DISPLAY OF PAST HEALTH CARE USE TO AID IN PREDICTING FUTURE HEALTH STATUS

BACKGROUND OF THE INVENTION (a) Field of the Invention

The present invention relates to a system and method for automated extraction and display of past health care use to aid in predicting future health status. Medical and pharmacy and place of treatment information is preferably used to provide historical use displays by individual or by groups of individuals.

(b) Description of the Prior Art

U.S. Pat. No. 6,059,724 teaches a system for predicting future health and U.S. Pat. No. 6,110,109 teaches a system and method for predicting disease onset. Neither these references nor any other references known by the inventors teaches the use of visualization algorithms to succinctly summarize the entire past claim data so that the past can be linked to the future for algorithm designers, clinicians, and actuaries.

SUMMARY OF THE INVENTION

The present invention relates to a system and method for automated extraction and display of past health care use to aid in predicting future health status. We assume that medical claim data is available for some individuals, that pharmacy claim data available for other individuals, and that both medical and pharmacy claim data is available for other individuals. For the claim data available by individual, the raw medical and pharmacy claims data is converted into Hierarchical Major Clinical Condition (HMCC) and Place of Treatment (POT) time-series data and displayed to facilitate the health assessment of a member's total clinical conditions and aid in predicting his or her future health status.

Each medical and pharmacy claim of the member is mapped onto one or more HMCC/POT-time cells. At the end of mapping, multiple entries in each HMCC-time cell are accumulated with the temporal resolution determined as a function of group size and temporal fidelity required for model building. Individual HMCC/POT-time maps can be rolled up to a group level to facilitate employer-by-employer or market-by-market comparison so that clinical strategies can be tailored to each employer or geographic region. Multiple nonlinear visualization mapping algorithms are provided to cope with highly nonlinear nature of claims cost data.

More particularly, the present invention is for a method for automated extraction and display of past health care use data to aid in predicting future health status, comprising the steps of: a. accessing a database containing insurance claim information; b. mapping the insurance claim information by individual and claim to at least one of a set of major clinical conditions to create a plurality of MCC claim mappings; c. associating each MCC claim mapping with an individual identifier, a time identifier, and a cost identifier; and, d. creating at least one display for at least one individual showing, by each set of major clinical conditions over a time period, a representation of the MCC claim mappings, each MCC claim mapping being weighted by its respective cost identifier.

BRIEF DESCRIPTION OF THE DRAWINGS

A better understanding of the present invention will be had upon reference to the following description in conjunction with the accompanying drawings, wherein.

DETAILED DESCRIPTION OF THE PREFERRED EMBODIMENT

The predictive model uses features derived from multiple data sources that are fed to learning algorithms. One of the features used in this process is hierarchical categorization by Major Clinical Conditions or MCCs. Both medical and pharmacy claims data is mapped into these MCCs.

The International Classification of Diseases, 9th Revision, was detailed by the World Health Organization. United States Department of Health and Human Services publication DHHS Pub. No. PHS 94-1260, October 1994, is the 9th Revision of the International Classification of Diseases—Clinical Modifications. These classifications are incorporated herein by reference. The classification codes contained therein are more commonly known as ICD9-CM codes. These codes are used by hospitals and health care professionals to bill for charges and services. These codes identify the specific diagnosis assigned to each patient at the time of treatment. For each visit or service, there can be multiple diagnoses.

Because there are approximately 12,000 ICD9-CM codes, the number of codes needed to be collapsed and categorized into cohesive broad groups or categories that made clinical sense, with flexibility in drill down into sub or sub-sub groups. Realizing that the ICD9-CM codes were too many, the major categories in the ICD9-CM code book were too few and too broad, episode treatment groups (ETGs) were numerous and the major practice categories (MPCs) within ETGs were too broad, and diagnosis-related groups (DRG) only included hospital based treatment, we embarked on developing the MCCs, which classified all the ICD9-CM diagnostic codes into 33 major categories plus a summary category for chronic conditions.

In developing the MCCs, we considered those diseases/conditions that were high risk/high cost and potentially presented opportunity for management or guidance. For consistency in coding, we also evaluated those conditions that had or could have Disease Management Programs in place. Classifying the 12,000 ICD9-CM codes into 34 categories enables the predictive model to run more efficiently, and allows us to present a visual picture over time that follows the progression of illness and can be easily interpreted. As ICD codes are changed or revised, the changed or revised codes can be easily mapped into the same 34 MCCs, thereby providing a method and system which the user of the visual picture sees as transparent to the changes and revisions.

Within each major clinical condition, there may be specific conditions or categories that are more definitive or may be clinically significant. Because all ICD9-CM codes are included in the MCCs, we developed sub-categories and sub-sub categories to allow a greater level of detail; e.g., MCC—

Cancer (CAN), sub-MCC Digestive (DIG), sub-sub MCC—Upper gastrointestinal (UGI) and sub-sub MCC Lower gastrointestinal (LGI). Although there are 34 Major Clinical Conditions, within the MCCs, there are 259 MCC, Sub-MCC, and Sub-sub-MCC categories. Each MCC has been assigned a three letter acronym (TLA); the sub-MCCs and sub-sub MCCs have also been assigned acronyms of 2-4 letters.

To complete the clinical picture, we mapped pharmacy data to corresponding MCCs by using drug classes. Certain drug classes can be used to treat multiple conditions. In those instances, logic was incorporated into the model to identify the presence of a condition before mapping the pharmacy data. That logic is, if the corresponding medical claim data was available to identify the relevant MCC, the pharmacy claim data was mapped to the same MCC. An example would be oral anti-diabetic agents are primarily used to treat diabetes, but it is sometimes used in the treatment of polycystic ovary disease (PCOS). In this instance, the model scans for the presence of a diagnosis of either diabetes or PCOS and maps the drug claim to the appropriate diagnosis; if both diagnoses are present, the claim is equally allocated to both diseases. However, if the corresponding medical claim data was not available (for example, because only pharmacy claim data was available for that individual or because the pharmacy claim data was received and processed before the pharmacy claim data), the pharmacy claim data is equally allocated among all MCCs that include the drug class related to the claim.

While these drug classes are not as precise in identifying a disease or illness (some medications can be used for multiple disease processes), they are of value in interpreting and evaluating a member's total health picture. By classifying drugs by disease condition, one can get a quick visual picture of individual member adherence to medication by looking at the consistency of color or shades of gray intensity over time and the gaps in refills for those drugs that should be taken on a regular basis.

It is noted that pharmacy claim data may be submitted by National Drug Code (NDC). There are other pharmacy drug code systems in use, such as the Medispan generic product identifier (GPI) classification code system. All of these code systems can be mapped to the drug classes identified below with each of the 34 MCCs.

The following explains the 34 MCCs with the corresponding Sub-MCC, and Sub-sub-MCC categories and the ICD9 codes mapped to each MCC, Sub-MCC, and Sub-sub-MCC category and the drug classes mapped to each MCC, Sub-MCC, and Sub-sub-MCC category.

MCC category #1 is CAD—coronary artery disease. The overall category has the following ICD9 Codes mapped thereto—V4581, V4582, 410, 412, 413, 411, 414, 272. Drug classes mapped to this category are cardiotonics, anti-anginals, beta blockers, calcium channel blockers, cardiology supplies. Sub-MCCs for CAD are as follows: CABG—coronary artery bypass graft with ICD9 Code—V4581; PTCA—percutaneous transluminal coronary angioplasty with ICD9 Code—V4582; MI—myocardial infarction with ICD9 Codes 410, 411; ANG—angina with ICD9 Code 413; ISCH—other ischemic heart disease with ICD9 Code 411; ASHD—coronary atherosclerosis with ICD9 Code 414; and CHOL—hyperlipidemia with ICD9 Code 272 and drug class cholesterol lowering agents. CAD has no Sub-sub-MCC categories.

MCC category #2 is CHF—congestive heart failure with ICD9 Code 428 mapped thereto. Drug classes mapped to CHF are Beta Blockers, antihypertensive agents, and diuretics. CHF has no sub-MCCs or sub-sub-MCCs.

MCC category #3 is HDZ—other heart disease. The overall category has the following ICD9 Codes mapped thereto—394-3979, 424-4243, 426, 427, 420-422, 429, 4249, V151, 425. One sub-MCC is VALV—valve diseases/disorders with ICD9 Codes 394-3979, 424-4243 and drug classes of Coumarin. Another sub-MCC is ARRH—arrhythmias/conduction disorders with ICD9 Codes 426, 427 and drug classes of antiarrythmics and coumarin, with sub-sub-MCC SVI—supraventricular arrhythmia with ICD9 Codes 4270, 4272, 4273, and sub-sub-MCC VTC—ventricular arrhythmia with ICD9 Codes 4271, 4274, 4275. The remaining sub-MCCs for this category are ITIS—carditis with ICD9 Codes 420-422, 4290, 4249; SURG—surgery to heart with ICD9 Code V151; MYOP—cardiomyopathy with ICD9 Code 425; and OTHR=sum of MCC−sub-MCC with drug class of pressor agents.

MCC category #4 is CIR—circulatory. The overall category has the following ICD9 Codes mapped thereto—390-459 785, 7943, 7892, V125, 79092. Drug classes mapped to this category are sclerosing agents and anticoagulants. One sub-MCC is HBP—hypertension with ICD9 Codes 401-405, with drug classes of Beta Blockers, Calcium Channel Blockers, Antiarrhythimics, antihypertensives, diuretics, with sub-sub-MCCs EHBP—essential hypertension with ICD9 Codes 4011, 4019, and COMP—complicated hypertension with ICD9 Codes 4010, 402-405. The remaining sub-MCCs for this category are ART—arteriosclerosis with ICD9 Codes 440 and drug class of cholesterol lowering agents; ANUR—aneurysms with ICD9 Codes 441, 442; and OTHR=sum of MCC−sub MCC with drug class of miscellaneous cardiovascular agents; vasodilators, cardioplegics, vasoconstrictors, vasoprotectants. All codes found in MCCs #1, 2, 3, 18, 12 are excluded from this MCC and its sub-MCCs and sub-sub-MCCs.

MCC category #5 is BLD—blood and blood forming organs. This category has the following ICD9 Codes mapped thereto—280-289, 7900-79009, V123. Drug classes mapped to this category are hematopoietic agents except EPO, GM-GSF) and Interleukins, Hemostatics, Platelet aggregation inhibitors, Hematorheological, Hemin, In vitro Hema agents, plasma expanders, plasma proteins, protamine, thrombolytic enzymes, hematologic O2 transporter assigned to the overall category. Sub-MCCs are as follows: ANEM—anemias with ICD9 Code/s 280-285; and OTHR=sum of MCC−sub MCC. All codes listed in MCC 16 are excluded from this MCC and its sub-MCCs. BLD has no sub-sub-MCCs.

MCC category #6 is CAN—malignant neoplasms. This category has the following ICD9 Codes mapped thereto—140-2089, 230-239, V10-V109, V131, V581, V672. Drug classes mapped to this category are antineoplastics, erythropoeitins, GM-CSF, interleukins, immunosuppressive agents. One sub-MCCs is BRST—breast with ICD9 Codes 174-1759. Another sub-MCC is DIG—digestive and peritoneum with ICD9 Codes 150-1599, with sub-sub-MCCs of UGI—upper gastrointestinal with ICD9 Codes 150-152, LGI—lower gastrointestinal with ICD9 codes 153-154, PBL—pancreas, liver with ICD9 Codes 155-157, and OTHR—other gastrointestinal with ICD9 Codes 158-159. Another sub-MCC is RES—respiratory with ICD9 Codes 160-165, with sub-sub-MCCs of UAIR—upper airway with ICD9 Codes 160-161, LAIR—lower airway with ICD9 Codes 162-163, and OTHR—other respiratory with ICD9 codes 164-165. Another sub-MCC is GU—genitourinary system with ICD9 Codes 179-1899, V131, with sub-sub-MCCs of FGEN—female genital with ICD9 Codes 179-184, V131, MGEN—male genital with ICD9 Codes 185-187, LGU—lower genitourinary with ICD9 Code 188, and UGU—upper genitorurinary with ICD9 Code 189. Additional sub-MCCs are LYMP—lymphatic and hematopoietic with ICD9 Codes 200-2038; SEC—secondary cancer with ICD9 Codes 196-1991; and H&N—head and neck with ICD9 Codes 140-1499. Another sub-MCC is SKN—skin cancers with ICD9 Codes 173-1739, 172, with sub-sub-MCCs of MEL—malignant melanoma with ICD9 Code 172, and OTHR—other skin cancer with ICD9 Code 173. The remaining sub-MCCs are LEUK—leukemia with ICD9 Codes 2040, 2042-208 (excludes 2041); NER—nervous system with ICD9 Codes 191-192; END—endocrine system with ICD9 Codes 193-194; H/O—history of cancer with ICD9 Codes V10-V109, V581, V672; and OTHR=sum of MCC−sub-MCCs. All codes found in MCC #23 are excluded from this MCC and its sub-MCCs and sub-sub-MCCs.

MCC category #7 is BEN—benign neoplasms. This category has the following ICD9 Codes mapped thereto—210-2299, V1241. Sub-MCCs are NER—benign neoplasms of the brain and nervous system with ICD9 Codes 225, V1241; and OTHR—all other=sum of MCC−sub-MCCs. This category has no sub-sub-MCCs.

MCC category #8 is DIA—diabetes. This category has the following ICD9 Codes mapped thereto—250, 6480, (3572, 3371, 7135, 3540-3559, 3581), (3620), (36641), (58381, 58181), (7854, 44381), 7902, 7915—codes in parenthesis are secondary codes. These secondary codes are used in conjunction with a primary diagnosis; the primary diagnosis must be coded first as it is the underlying cause of the secondary illness. For example, nephropathy (kidney failure) is frequently a complication of diabetes, but it can also be caused by other diseases. In this instance, diabetes would be coded primary (as it was the cause of nephropathy) and nephropathy would be coded as secondary. Drug classes mapped to DIA are antidiabetic agents, needles & syringes, diabetic supplies, wound care products, control reagents, Angiotensin Converting Enzyme Inhibitors (ACE), ACE and thiazides, Angiotensin II Receptor Blockers (ARB), ARBs and thiazides. Sub-MCCs are as follows: NEU—neuropathy with ICD9 Codes 2506, (3572, 3371, 7135, 3540-3559, 3581); EYE—ophthalmic complications with ICD9 Code/s 2505, (3620, 36641); NEP—nephropathy with ICD9 Code/s 2504, (58381, 58181); PVD—peripheral vascular disease with ICD9 Code/s 2507 (7854, 44381); and OTHR=Sum of MCC−sub MCC. This category has no sub-sub-MCCs.

MCC category #9 is OBE—obesity. The following ICD9 Codes are mapped thereto—27800, 27801. Drug classes mapped to OBE are nnorexiants, antiobesity agents. This category has no sub-MCCs or sub-sub-MCCs.

MCC category #10 is END—endocrine. ICD9 Code/s 240-279 7945, 7946, 7947, 7834-7839, 7994, V122, 7916, 70904, V150, V121, V691 are mapped to this category. Sub-MCCs are as follows: THY—thyroid with ICD9 Codes 240-246, 79094 and drug class of thyroid hormones; GLD—other glandular disorders with ICD9 Codes 251-259 (Exclude 2564) and drug classes of corticosteroids, adrenal inhibitors, calcium regulators, hormone receptor modulators, luteinizing hormone releasing, luteinizing hormone agonist, GnRH/LHRH antagonists, grown hormones, somatostatic agents, posterior pituitary agents, corticotrophin, prolactin inhibitors, dopamine receptor agents; META—other metabolic and immunity disorders with ICD9 Codes 270-279, V150 and drug class of gout agents; NUTR—nutrition with ICD9 Codes 260-269, 7830-7833, V121, V691 and drug classes of vitamins, minerals & electrolytes, nutrients, dietary products; SYNX—dismetabolic syndrome X with ICD9 Code 2777; and OTHR=sum of MCC−sub MCC and drug classes of metabolic modifiers and miscellaneous endocrine combinations. All codes found in MCCs #1, 8, 9, 11, 16 are excluded from this MCC and its sub-MCCs. There are no sub-sub-MCCs for this category.

MCC category #11 is GUS—genitourinary system. The following ICD9 Codes are mapped to this category—580-629, 788, 7944, 7935, 7938, 7939, V130, 7910-7913, 7917-7919, 7922, 7950, 7951, V1329, V6701, 2564. Some of the sub-MCCs are KUB—kidneys, ureters, bladder with ICD9 codes 580-584, 587, 589-599, 7910-7913, 7917-7919, V130 and drug classes of Urinary anti-infectives, urinary antispasmodics, acidifiers, alkalinizers, urinary analgesics, cystinosis agents, interstitial cystits agents, urinary stone agents; GU irrigants, uroprotectant, GI_GU ostomy supplies; MALE—male genitourinary with ICD9 Codes 600-608, 79093, 7922 and drug classes of androgen-anabolics, impotence agents, prostatic agents; and BRST—breast with ICD9 Codes 610-611. Another sub-MCC is FEM—female with ICD9 Codes 614-629, 7950, 7951, V1329, V6701, 2564 and drug classes of estrogens, progestins, selective estrogen receptor modulators, fertility regulators, progesterone antagonists, menopausal sx suppressants, vaginal products, with sub-sub-MCC is as follows: PCOS—polycystic ovaries with drug class of oral antidiabetic agents. The final sub-MCC for this category is OTHR=sum of MCC−sub MCC. All codes found in MCC # 12 are excluded from this MCC and its sub-MCCs.

MCC category #12 is CKD—chronic kidney disease. This category has the following ICD9 Codes mapped thereto—5811, 58181, 5819, 582, 75312, 75313, 75314, 75316, 75319, 40301, 40311, 40391, 40402, 40403, 40412, V56, 7925, 40413, 40492, 40493, 585, 586, 588. Drug classes mapped to this MCC are erythropoietin, potassium removing resin, peritoneal dialysis solutions, hemodiialytics, and peritoneal dialysis supplies. CKD has no sub-MCCs or sub-sub-MCCs.

MCC category #13 is PRE—pregnancy. ICD9 Codes 630-677, 7923, V1321, V137, V22-V24, V27-V28 are mapped to this category. Sub-MCC are as follows: ECT—ectopic/molar/abortive with ICD9 Code/s 630-639; COM—complications with drug classes of oxytocics, abortifacients, uterine relaxants, prostaglandins; DEL—normal delivery, MUL—multiple; L&D—labor and delivery; CARE—pregnancy care/outcome of delivery/contraception with drug class of contraceptives; and OTHR=sum of MCC−sub-MCC. All codes found in MCC #8 are excluded from this MCC and its sub-MCCs. There are no sub-sub-MCCs for this category.

MCC category #14 is NEO—neonates. ICD9 Codes 760-779, V29-V39 are mapped thereto. There are no sub-MCCs or sub-sub-MCCs for this category.

MCC Category #15 is ANO—congenital anomalies. ICD9 Codes 740-759, V136 are mapped thereto. Sub-MCCs are as follows: CNS—central nervous system with ICD9 Codes 740-742; HRT—cardiovascular with ICD9 Codes 745-747; DIG—digestive with ICD9 Codes 7503-751; MUS—musculo-skeletal with ICD9 Codes 754-75659; GUS—genitourinary system with ICD9 Codes 752-753; and OTHR=sum of MCC−sub-MCC. All codes found within MCC 12 are excluded from this MCC and its sub-MCCs. There are no sub-sub-MCCs for this category.

MCC Category #16 is RAR—rare diseases. The sub-MCCs are as follows: CF—cystic fibrosis with ICD9 Code 2770 and drug class of cystic fibrosis agents; HEM—hemophilia with ICD9 codes 2860, 2861, V8302 and drug class of antihemophilics; MS—multiple sclerosis with ICD9 Codes 340, 3419 with drug class of MS Agents; MG—myasthenia gravis with ICD9 code 3580 with drug class of antimyasthenic agents; LUP—lupus with ICD9 Codes 7100, 6954; ALS—amyotrophic lateral sclerosis with ICD9 Code 3352 with drug class of ALS agents; CID—chronic inflammatory demyelinating polyneuropathy with ICD9 Codes 3570, 3578, 3579; DRM—dermatomyositis with ICD9 Code 7103; PAR—parkinson's with ICD9 Code 3320 with drug class of antiparkinson agents; POL—polymyositis with ICD9 Code 7104; RA—rheumatoid arthritis with ICD9 codes 714-7143; SCL—scleroderma with ICD9 code 7101; and SCA—sickle cell anemia with ICD9 codes 2826-2869. There are no sub-sub-MCCs for this category.

MCC category #17 is TRA—transplant. ICD9 Codes V420-V421, V426, V427, V428-V4299, 9968 and drug class of immunosuppressants are mapped to this category. There are no sub-MCCs or sub-sub-MCCs for this category.

MCC category #18 is CER—cerebrovascular. The following ICD9 Codes are mapped thereto—430-432, 433-434, 78002, 435, 438. The sub-MCCs are as follows: HEM—hemorrhage with ICD9 Codes 430-432; OCC—occlusions with ICD9 Codes 433-434 and drug class of coumarin agents; TIA—transient ischemic attach with ICD9 Codes 78002, 435 and drug class of coumarin agents; and SEQ—late effects or sequelae of cerebrovascular accident with ICD9 Code 438. This category has no sub-sub-MCCs.

MCC category #19 is NER—nervous system. This MCC has the following ICD9 Codes mapped thereto—320-359, 7810-7814, 7816-7818, 78199, 7843, 7840, 7940, 79410, 79417, 79419, 7844-7846, 7920, V1240, V1249. Sub-MCCs are as follows: INFL—inflammatory diseases with ICD9 Codes 320-326; DEG—hereditary/degenerative diseases with ICD9 Codes 330-337; MIGR—migraine with ICD9 Code 346 and drug class of migraine products and beta blockers; EPIL—epilepsy with ICD9 Code 345 with drug class of anticonvulsants; and OTHR=sum of MCC–sub-MCCs. All codes found within MCCs 8, 16, 21 are excluded from this MCC and its sub-MCCs. There are no sub-sub-MCCs for this category.

MCC category #20 is SOR—sense organs. ICD9 Codes 360-389, 79411-79416, 78193 are mapped to this MCC. One sub-MCCs is EYE—eye with ICD9 Codes 360-379 (exclude 3620, 36641), 79411-79414, 78193 with drug class of ophthalmic agents, with sub-sub-MCCs being CATR—cataracts with ICD9 Code 366, GLAU—glaucoma with ICD9 Code 365, RET—retinal diseases with ICD9 Codes 361-363, VIS—visual disturbances with ICD9 Codes 367-369, OPTC—optic nerve with ICD9 Code 377, and OTHR=sum of sub-MCC–sub-sub MCC. The other sub-MCC for this category is EAR—ear with ICD9 Codes 380-389, 79415-79416 with drug class of otic agents, with sub-sub-MCCs of XEAR—external ear with ICD9 Codes 380, MEAR—middle ear with ICD9 Codes 381-385, OTHR—other ear with ICD9 Code 388.

MCC category #21 is TRM—trauma. ICD9 Codes 800-8049, 805-8069, 952-9529, 851-8541, 925-9252, 344-3449, 808-8089, 820, 8181-819, 828-8281 are mapped thereto. The sub-MCCs are as follows: SKUL—skull fractures with ICD9 Codes 800-8049; SPFX—spinal cord fracture with ICD9 Codes 805-8069; SPNJ—spinal cord injury with ICD9 Codes 952-9529; BRN—brain laceration or contusion with ICD9 Codes 851-8541; F/N—crushing injury face/neck/scalp with ICD9 Codes 925-9252; PRLY—paralysis with ICD9 Codes 344-3449; HIP—hip/pelvis/neck of femur fractures with ICD9 Codes 808-8089, 820; FXU—multiple fracture upper limbs with ICD9 Codes 8181-819; FXUL—multiple fractures lower and/or upper limbs with ICD9 Codes 828-8281. This MCC has no sub-sub-MCCs.

MCC category #22 is MUS—musculo-skeletal and connective tissue. ICD9 Code/s 710-739, 7930, 7937, V134, V135, V674, 7815, 78191, 78192, 7842 are mapped thereto. Drug classes mapped to the overall category are analgesics, narcotic and non-narcotics, anti-inflammatory agents, neuromuscular agents, depolarizing and non-depolarizing muscle relaxants, musculoskeletal therapy agents. The sub-MCCs are as follows: OSTE—osteoporosis with ICD9 Code 7330; ARTH—arthritis (excludes rheumatoid arthritis) with ICD9 Codes 712, 713, 715, 720, 721, V134; BACK—back/neck pain with ICD9 Codes 722-724, 846, 847; ATRP—arthropathies with ICD9 Codes 712, 713, 715, 720, 721, V134; INF—infections with ICD9 Codes 711, 730; JNT—joint specific disorder with ICD9 Codes 717-719; SOFT—soft tissue disorders with ICD9 Codes 725-729; FORM—malformations with ICD9 Codes 734-738; OTHR=sum of MCC–sub-MCC. All codes found within MCCs 8, 16 are excluded from this MCC and its sub-MCCs. This category has no sub-sub-MCCs.

MCC category #23 is HIV—HIV and related conditions. ICD9 Codes 042, V08, V6544, 176, 1363, 79571 and drug class of antiviral agents are mapped thereto. Sub-MCCs are as follows: KAPO—Kaposi's sarcoma with ICD9 Code 176; PCP—pneumocystic carnii pneumonia with ICD9 code 1363; OTHR=sum of MCC–sub MCC. This category has no sub-MCCs.

MCC category #24 is INF—infections. ICD9 Codes 001-1398, 7901, 7907, 7908, 7953-7956, V01-V02, V07, V09, V120, V1585 are mapped thereto. Drug class mapped to the MCC is anti-infective agents. Sub-MCCs are as follows: CAND—candidial with ICD9 Codes 11281, 11284, 11285, 1124, 1125, 11283; MYCO—mycobacteria with ICD9 Codes 0310, 0312; MEN—meningococcal infection with ICD9 Codes 036; SEP—septicemia with ICD9 Code 038; OTHR=sum of MCC–sub-MCC. All codes found within MCCs 23, 26 are excluded from this MCC and its sub-MCCs. This category has no sub-sub-MCCs.

MCC category #25 is RES—respiratory. ICD9 Codes 460-519, 786 (exclude 7865), 7942, 7931, 7932, V461, 7847-7849, 7841, 79091, 7991, 7990, V126, V1584 are mapped thereto. Sub-MCCs are as follows: ASTH—asthma with ICD9 Code 493 with drug classes of Antiasthmatics nebulizers, peak flow meters; COPD—chronic obstructive pulmonary disease with ICD9 Codes 491-492, 496 with drug classes of Alpha-proteinase inhibitor, anticholinergics, long acting beta-agonists, nebulizers; INF—infections and inflammatory disorders with ICD9 Codes 460-466, 472-477, 47821-47824, 47871, 4788, 480-487, 490, 513, 47829 with drug classes of allergenic extracts, antihistamines, nasal products, cough/cold/allergy; FAIL—respiratory failure with ICD9 Codes 5188, 5190 with drug class of hypoxic respiratory failure agents; and OTHR=sum of MCC–sub-MCC with drug class of other respiratory therapy supplies, respiratory aids, medical gases, miscellaneous respiratory, pleural sclerosing agents. This MCC has no sub-sub-MCCs.

MCC category #26 is DIG—digestive. ICD9 Codes 520-579, 787, 7933, 7934, 7891, 7895, 7948, 7905, V127, 7924, 7921, 04186, 7914 and drug class of ostomy supplies are mapped thereto. A sub-MCCs is: UGI—upper gastro-intestinal with ICD9 Codes 520-537, 5301, 04186, 7924, with sub-sub-MCCs of PUD—peptic ulcer disease/gastro-esophageal reflux disease with ICD9 Codes 520-537, 5301, 04186, 7924 and drug class of antacids, ulcer drugs, prostaglandins, MOU—mouth with ICD9 Codes 520-529, 7924 and drug class of local mouth and throat agents, ESO—esophagus with ICD9 Codes 5300, 5303-5307, 53083-5309, and STOM—stomach with ICD9 Codes 536-537 and drug class of antiemitics, digestive aids. Other sub-MCCs are: LGI—lower gastro-intestinal with ICD9 Codes 540-569, 7921 and drug class of anorectal agents, laxatives, antidiarrheals, antiflatulent combos, gi stimulants, intestinal acidifiersrs irritable bowel agents, (IBS) agents; P/B—pancreas/biliary with ICD9 Codes 574-577, 7914 with drug class of gallstone agents; LIV—liver with ICD9 Codes 570-573 and drug class of hepatropic agents; and OTHR=sum of MCC–sub-MCC with drug class of miscellaneous GI, phosphate binders.

MCC category #27 is SKN—skin and subcutaneous tissue. ICD9 Codes 680-709, 700-709, 7820-7822, 7827-7829, V133, V820 are mapped thereto. The sub-MCCs are as follows: INF—inflammatory/infections with ICD9 Codes 680-698 with drug class of Dermatologics,—acne, topical antibiotics, topical antifungals, topical antihistamines, antiinflammator, antiprruitics, antipsoriatics antiviral, corticosteroids, scabicides, sunscreens, wound care, poison ivy; AN—acanthosis nigricans with ICD9 Codes 7012; and OTHR=sum of MCC–sub-MCC with drug class of Dermatologics, analgesics, antiseborrheic, antineoplastic, bath, burn, cauterizing, tar, diaper rash, emollients, enzymes, hair, keratolytics, immunomodulating, linaments, anesthetics, pigmenting, vasoprotectants, miscellaneous topical, podiatric, miscellaneous dermatology. All codes found within MCC 16 are excluded from this MCC and its sub-MCCs. There are no sub-sub-MCCs for this category.

MCC category #28 is INJ—Injury and poisoning. ICD9 Codes 800-999, E800-E807, E820-E888, E900-E929, E950-E999, V155-V156, V1586, V14 are mapped thereto. The sub-MCCs are as follows: ORG—injury to major organ with ICD9 Codes 860-869; DRUG—drug complications with ICD9 Codes 960-979, E850-E858, E930-E949, V14; COMP—complications with ICD9 Codes 995-9954, 99586-999, E870-E879; OTHR=sum of MCC–sub MCC with drug class of chleating agents. All codes found within MCC 17, 21, 29, 30 are excluded from this MCC and its sub-MCCs. This category has no sub-sub-MCCs.

MCC category #29 is BRN—burns. ICD9 Codes 940-949, E890-E899 are mapped thereto. Sub-MCCs are as follows: ACC—accident/fire/flames with ICD9 Code/s E890-E899; and OTHR=sum of MCC–sub-MCC. This category has no sub-sub-MCCs.

MCC category #30 is MVA—motor vehicle accident. ICD9 Codes E810-E819 are mapped thereto. This category has no sub-MCCs or sub-sub-MCCs.

MCC category #31 is MEN—mental/behavioral disorders. ICD9 Codes 290-319, V112, V118, V119, V154, V673, V693, V698, V692, V111, V110, V1582, V113 and drug classes of antianxiety, antidepressants, antipsychotics, hypnotics, amphetamines, analeptics, misc stimulants, antidementia, smoking deterrants, chemical dependency agents, combination psycho agents are mapped thereto. Sub-MCCs are as follows: DEP—depression with ICD9 Codes 296, 3004, 311, V111 and drug class of antidepressants; SCHZ—schizophrenia with ICD9 Codes 295, V110; ABUS—substance abuse with ICD9 Codes 304, V1582 and drug classes of agents for chemical dependency, agents for narcotic withdrawal; ALCO—alcoholism with ICD9 Codes 291, 303, 7903, V113 and drug class of alcohol deterrents; SMOK—smoking with ICD9 Code 3051 and drug class of smoking deterrents; and OTHR=MCC–sub-MCC and drug classes of antianxiety agents, antipsychotics, misc psy & neuro agents, antidementia agents, combination psychotherapeutics. This category has no sub-sub-MCCs.

MCC category #32 is SNS—signs and symptoms with ICD9 Codes 780-799. Sub-MCCs are as follows: COMA—coma with ICD9 Codes 78001, 78003; CONS—altered consciousness with ICD9 Codes 78009, 7801-7804; ABD—abdomen with ICD9 Codes 7890, 7893, 7894, 7896, 7899, 7936; CHST—chest with ICD9 Code 7865; DTH—death with ICD9 Code 798; and OTHR=sum of MCC–sub-MCCs and drug classes of hypnotics, analgesics (narcotic & non narcotic), anti-inflammatory analgesics, local anesthetics, general anesthetics. All codes found within MCCs 4, 5, 8, 10, 11, 12, 13, 18, 19, 20, 22, 23, 24, 25, 26, 27, 31 are excluded from this MCC and its sub-MCCs. This category has no sub-sub-MCCs.

MCC category #33 is VCO—V-codes with ICD9 Codes V01-V83 with drug classes of vaccines and toxoids. One sub-MCC is EXAM—examination and screening with ICD9 Codes V70-V83, with sub-sub-MCCs of CAD—screening for ischemic heart disease with ICD9 Codes V810, V7791, HDZ—screening for other heart disease with ICD9 Code V812, BLD—screening for blood disorders with ICD9 Codes V780-781, V783-V789; CAN—screening for cancer with ICD9 Code V76, DIA—screening for diabetes with ICD9 Code V771, OBE—screening for obesity with ICD9 Code V778, END—screening for endocrine disorders with ICD9 Codes V770, V773-V775, V777, V772, V7799, GUS—screening genitourinary with ICD9 Codes V815, V157, V723, V816, V25-26, V724, ANO—screening for anomalies with ICD9 Codes V823-824, RAR—screening for rare diseases with ICD9 Codes V776, V821, V782, V8301, V838, NER—screening for nervous system disorders with ICD9 Codes V792-793, V800, SOR—screening for sense organ disorders with ICD9 Codes V801-803, V720-721, MUS—screening for musculo-skeletal disorders with ICD9 Codes V822, V8281, INF—screening for infections with ICD9 Codes V73-75 RES—screening for respiratory disorders with ICD9 Codes V813, V727, V814, DIG—screening for digestive disorders with ICD9 Code V722, SKN—screening for skin disorders with ICD9 Code V820, INJ—screening for poisoning with ICD9 Code V825, and MEN—screening for mental/behavioral disorders with ICD9 Codes V790-791, V798-799. The remaining sub-MCCs for this category are CARE—care given to infant/child with ICD9 Codes V20-V21; VAC—need for vaccine with ICD9 Codes V03-V06; FHO—family history of cancer with ICD9 Codes V16-V19; and OTHR=sum of MCC–sub MCCs. All codes found within MCCs 1, 3, 4, 5, 6, 7, 8, 9, 10, 11, 12, 13, 14, 15, 16, 17, 19, 20, 22, 23, 24, 25, 26, 27, 28, 31 are excluded from this MCC and its sub-MCCs.

MCC category #34 is CHR—chronic MCCs. This category includes items in prior detailed MCC categories or sub-MCCs that are considered chronic or long term. MCCs are listed first, followed by sub-MCCs; all acronyms have been previously detailed. MCC #1—CAD, MCC #2 CHF, MCC # 3 HDZ (excludes sub-MCC of ITIS), MCC #6—CAN, MCC #8—DIA, MCC #12—CKD, MCC #15—ANO, MCC #16—RAR, MCC #17—TRA, MCC #18—CER, MCC #23—HIV, sub-MCC EPIL (found within MCC #19—NER), sub-MCC ASTH (found within MCC #25—RES), sub-MCC COPD (found within MCC #25—RES), sub-MCC LIV (found within MCC #26—DIG), sub-MCC OSTEO (found within MCC #22—MUS), sub-MCC SCHZ (found within MCC #31—MEN), sub-MCC ALCO (found within MCC #31—MEN), sub-MCC HBP (found within MCC #4—CIR), sub-MCC ART (found within MCC #4—CIR), sub-MCC DEPR (found within MCC #31—MEN).

When medical claims are submitted, the submitter is identified. These submitters can be classified into place of treatment (POT) categories and mapped accordingly thereto. In the preferred embodiment, eleven POT categories are used. These POT categories are HI—hospital inpatient, OI—other facility inpatient, HS—hospital outpatient surgery, HE—hospital emergency, HO—hospital outpatient other, OO—other facility outpatient other, PI—physician service inpatient, PO—physician service outpatient, PP—physician service office visit, PX—physician service all other, and OP—other providers.

The following example will explain the system as could be used by a healthcare insurance company with its various health plans. In this type of system, there will be members of the various plans who will have provided member information and have been assigned a unique member identifier ("member ID"). These members may be enrolled for medical care, for prescription services, or both. Prior to some procedures being performed on a member, advance authorization may be required. Some of the member data, authorization data, pharmacy data, and medical claim data is submitted electronically and some is submitted by other means, such as, for example, by the submission on paper of a claim seeking reimbursement. However, all of the relevant data, whether submitted electronically or not, is established in an electronic database.

This database will generally contain more information than is needed for displaying the information used in the prediction system of the present invention. While other data relationships are possible to accomplish the same result, the system of the present invention extracts the desired data from the database and converts it so that it is included in four relational database tables, pharmacy claims, medical claims, authorizations, and membership, all related by member ID.

For example, in the preferred embodiment, it is desired to display medical and pharmacy claim information and place of treatment information over time for each individual. It is also desired in the preferred embodiment to display similar information by groups of members, for example, for all members of one PPO, or for all members in a geographic area. It is also desirable in the preferred embodiment to be able to compare similar information for different member groupings. Therefore, in this example, the membership database table will include at least the unique member ID, the PPO identifier, and the geographic area identifier or identifiers, for example, city, state, and zip code. If other comparison is desired, that additional needed information can be extracted from the electronic database and included in the appropriate relational database table.

As it is preferred to display medical, pharmacy, and place of treatment information over time and based on cost, the information relevant to map medical claim and pharmacy claim costs to MCC and to map where treatment was received to POT is extracted and included in the appropriate relational database table.

Using the data in the relational database tables, a transformation algorithm converts the ICD9 codes in the medical claims to MCC, Sub-MCC, and Sub-sub-MCC and associates time and cost information with each claim. A transformation algorithm converts the pharmacy claim information by drug class to MCC, Sub-MCC, and Sub-sub-MCC and associates time and cost information with each claim. Where there is a corresponding medical claim, and multiple possible MCCs for a drug class, the pharmacy claim is associated with the medical claim in the same MCC. Where there is no corresponding medical claim and where there are multiple possible MCCs for the drug class, the cost is equally divided among the possible drug classes. Further, a transformation algorithm converts the medical claim claimant information to one of the eleven place of treatment categories and associates time, utilization, and amount information with each claim.

For display of the information, cost amount over time is important. For a color display of cost amount, a "hot to cold" color scheme can be employed for each cost event. For example, the most costly procedures could be shown in the color red and the least costly procedures in the color blue, with other colors assigned to cost ranges in between. For a black and white display, "shades of gray" can be used with the darker shade (black) representing the most costly procedure.

Figure 1:
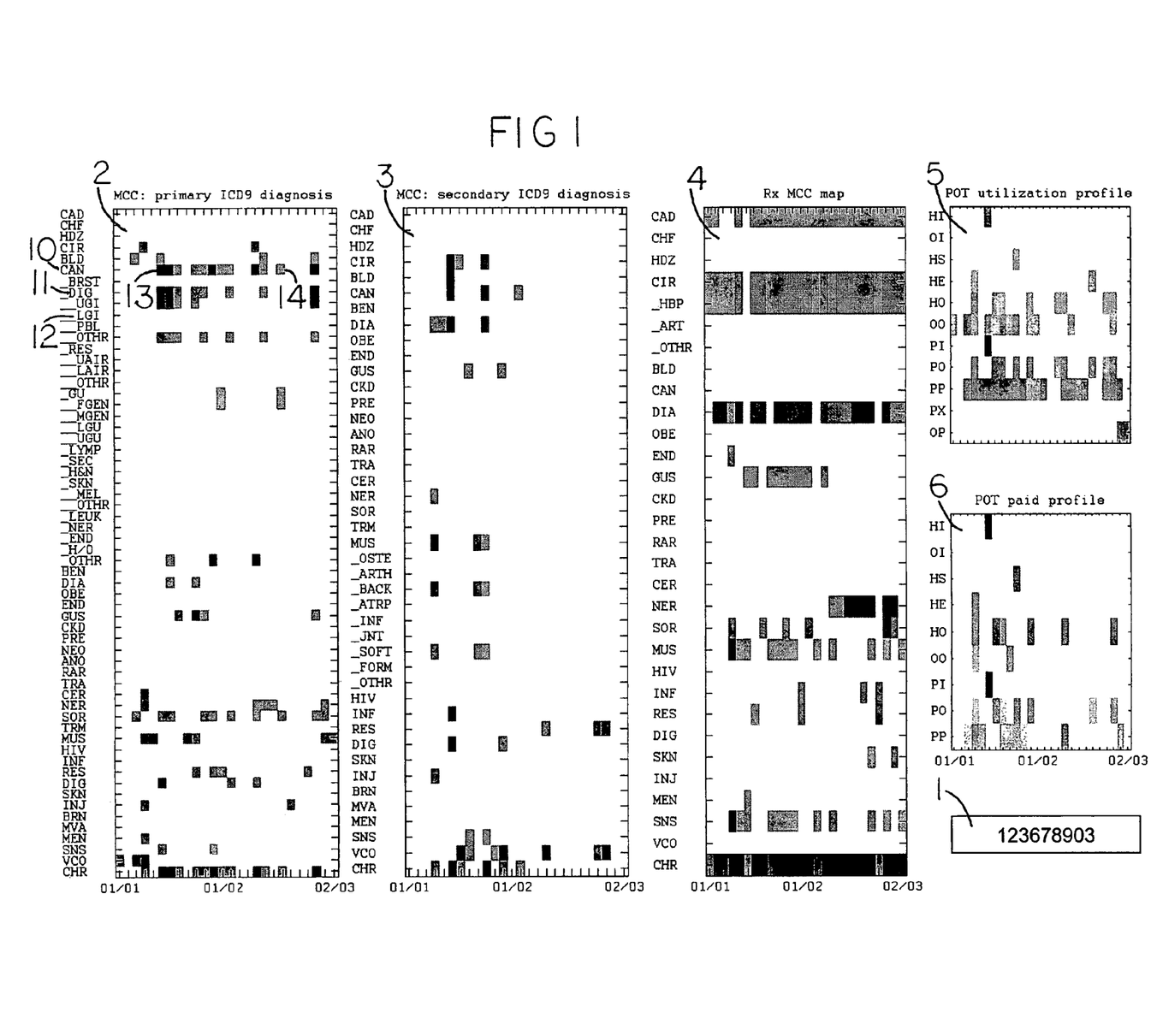
FIG. 1 is a sample display of an individual's health care history over a selected time period based on medical and pharmacy claim information shown by major clinical condition and subsets thereof and by place of treatment.

FIG. 1 is a sample information display for one unique individual. Item 1 identifies the member ID, for example, in this case, 123678903. Any unique identifier can be used.

Item 2 is a mapping over a time period (January 2001-February 2003) of the medical claim costs by MCC, Sub-MCC, and Sub-sub-MCC using the primary ICD9 diagnosis code associated with the medical claim. In the initial display of the preferred embodiment, the costs are displayed at the MCC level only, but the display user can expand the display to include the Sub-MCC and Sub-sub-MCC information by clicking on the MCC category the user wishes to expand.

As shown, item 2 has had MCC category #6 CAN (Malignant Neoplasm) expanded to show the thirteen secondary or sub-MCCs, namely BRST (Breast), DIG (Digestive & Peritoneum), RES (Respiratory), GU (Genitourinary Organs), LYMP (Lymph & Hema), SEC (Secondary), H&N (Head & Neck), SKN (Skin Cancer), LEUK (Leukemia), NER (Nervous System), END (Endocrine), H/O (V Codes) and OTHR (All Other). Additionally, some of these secondary or sub-MCCs are further divided into tertiary categories or Sub-sub-MCCs. DIG has four tertiary MCCs—UGI (Upper Gastrointestinal), LGI (Lower GI), PBL (Pancreas/Bile ducts/Liver) and OTHR (Other). RES has three tertiary MCCs—UAIR (Upper Airway), LAIR (Lower Airway) and OTHR (Other). GU has 4 tertiary MCCs—FGEN (Female Genital), MGEN (Male Genital), LGU (Lower Urinary) and UGU (Upper Urinary). SKN has two tertiary MCCs—MEL (Melanoma) and OTHR (Other).

The main or primary MCC categories are shown down the left side of the display as three letters without a dash in front of them, for example, item 10 is CAN. The Sub-MCCs are displayed with a "_" before the letters representing the Sub-MCC, for example, item 11 is _DIG. The Sub-sub-MCCs are displayed with a "_" before the letters representing the Sub-sub-MCC, for example, item 12 is _LGI.

As shown in FIG. 1, item 2, member 123678903 has medical claims related to the sixth primary MCC CAN (Malignant Neoplasm). More specifically, these claims are classified under the secondary or sub-MCC DIG (Digestive & Peritoneum), and are also further categorized to the tertiary or sub-sub-MCC UGI (Upper GI).

As seen, some of the representations are darker shades of gray than others. Item 13 identifies a darker black mark than the lighter gray item 14. This identifies that the cost associated with medical claim item 13 was greater than the cost associated with medical claim item 14.

Item 3 is a mapping over a time period (January 2001-February 2003) of the medical claim costs by MCC, Sub-MCC, and Sub-sub-MCC using the secondary ICD9 diagnosis code associated with the medical claim. Again, as with item 2, in the initial display of the preferred embodiment, the costs are displayed at the MCC level only, but the display user can expand the display to include the Sub-MCC and Sub-sub-MCC information by clicking on the MCC category the user wishes to expand and selecting one of the context menus.

As shown, item 3 has had MCC category #22 MUS (Musculoskeletal and Connective Tissues) expanded to show nine secondary or Sub-MCC categories. There are no Sub-sub-MCCs under MCC #22 MUS. As shown in item 3, under the primary MCC MUS, this member has claims more particularly associated with the secondary or Sub-MCCs BACK (Back/Neck pain) and SOFT (Soft Tissue Disorders).

Item 4 is a mapping over a time period (January 2001-February 2003) of the pharmacy claim costs by MCC, Sub-MCC, and Sub-sub-MCC using the drug class associated with the pharmacy claim. Again, as with items 2 and 3, in the initial display of the preferred embodiment, the costs are displayed at the MCC level only, but the user can expand the display to include the Sub-MCC and Sub-sub-MCC information by clicking on the MCC category the user wishes to expand.

As shown, item 4 has MCC category #4 CIR (Other Circulatory) expanded to show the three secondary or Sub-MCCs thereunder. Under MCC #4, CIR, this member has pharmacy claims that are especially related to Hypertension (secondary MCC HBP or high blood pressure).

Item 5 is a mapping over a time period (January 2001-February 2003) of the place of treatment (POT) utilization profile and item 6 is a mapping over the same time period of the place of treatment paid cost profile, using the eleven POT categories previously explained. As shown, this member has a lot of procedures done in an outpatient setting.

These individual displays have many uses. For example, an individual member may want to have a copy when going to a doctor. Also, members may be enrolled in clinical programs or other services which assist the members in managing their healthcare. These programs and services would have available these individual displays for all enrollees, but could also retrieve displays for members meeting certain criteria. For example, displays could be identified for any enrollee who has had two hospital emergency room visits over a set period, or who was an inpatient at a hospital.

Instead of showing displays of FIG. 1 by individual member, members can be grouped, for example by all members covered under a medical plan, and the information displayed for the total group as shown for the individual in FIG. 1. This type of group display would let the user see the medical, pharmacy, and place of treatment profiles for the entire group.

Figure 2:
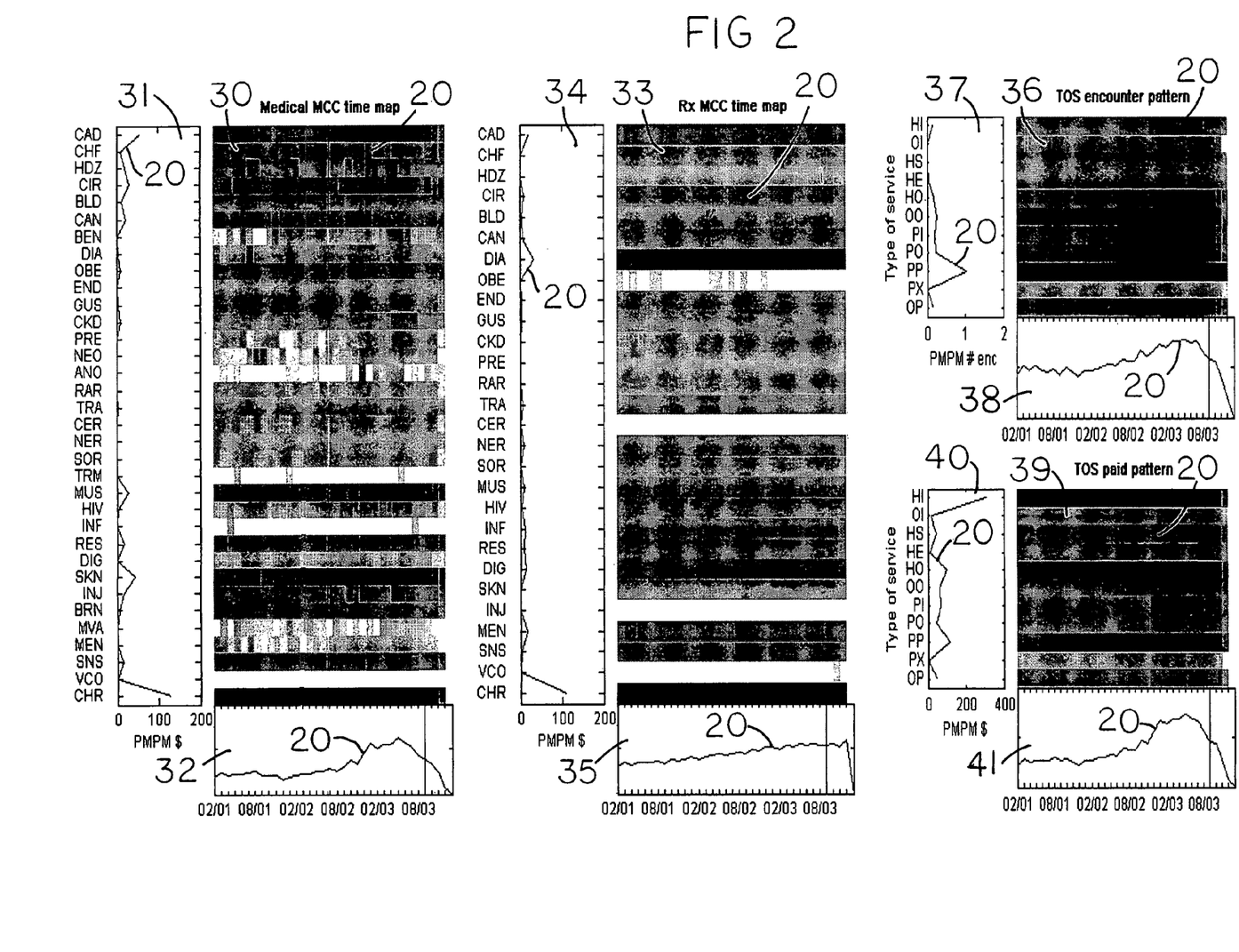
FIG. 2 shows group-level rolled-up data for medical, pharmacy, and place-of-treatment or type-of-service (TOS) data for a selected group of individuals.

An example of such a group display is shown in FIG. 2, where the data for a selected group detailed as item 20 is shown covering the period February 2001-January 2004. Items 30, 31, and 32 show medical claim information for group 20. The item 30 display is similar to the item 2 display in FIG. 1. This is a display over time of the primary ICD9 information mapped to the MCC categories, but showing cumulative information for all members of group 20. Again, the darker the shade of gray, the more the cost. Item 31 parallels item 30 and shows the total amount for group 20 per MCC over the total time period reflected in item 30. Item 32 reflects the total amount over all MCCs for group 20 over the same time period.

As with the related display group of items 30, 31, and 32, items 33, 34, and 35 form a related display group. These items show pharmacy claim information for group 20. The item 33 display is similar to the item 4 display in FIG. 1. This is a display over time of the pharmacy claim information mapped to the MCC categories, but showing cumulative information for all members of group 20. Item 34 parallels item 33 and shows the total amount for group 20 per MCC over the total time period reflected in item 33. Item 35 reflects the total amount over all MCCs for group 20 over the same time period.

Items 36, 37, and 38 relate to types of services (TOS) received by group 20. The TOS codes shown, HI, OI, HS, HE, HO, OO, PI, PO, PP, PX, and OP are the same as the POT codes previously explained. Item 36 shows the number of encounters over time for group 20 by TOS code. Item 37 shows total encounters for group 20 per TOS code for the time period of item 36. Item 38 shows the total encounters for group 20 for all of the TOS codes combined over the same time period as in item 36.

Items 39, 40, and 41 are similar to items 36, 37, and 38, as they also show TOS information over time for group 20. However, instead of showing information based on encounters, they reflect cost paid information.

Figure 3:
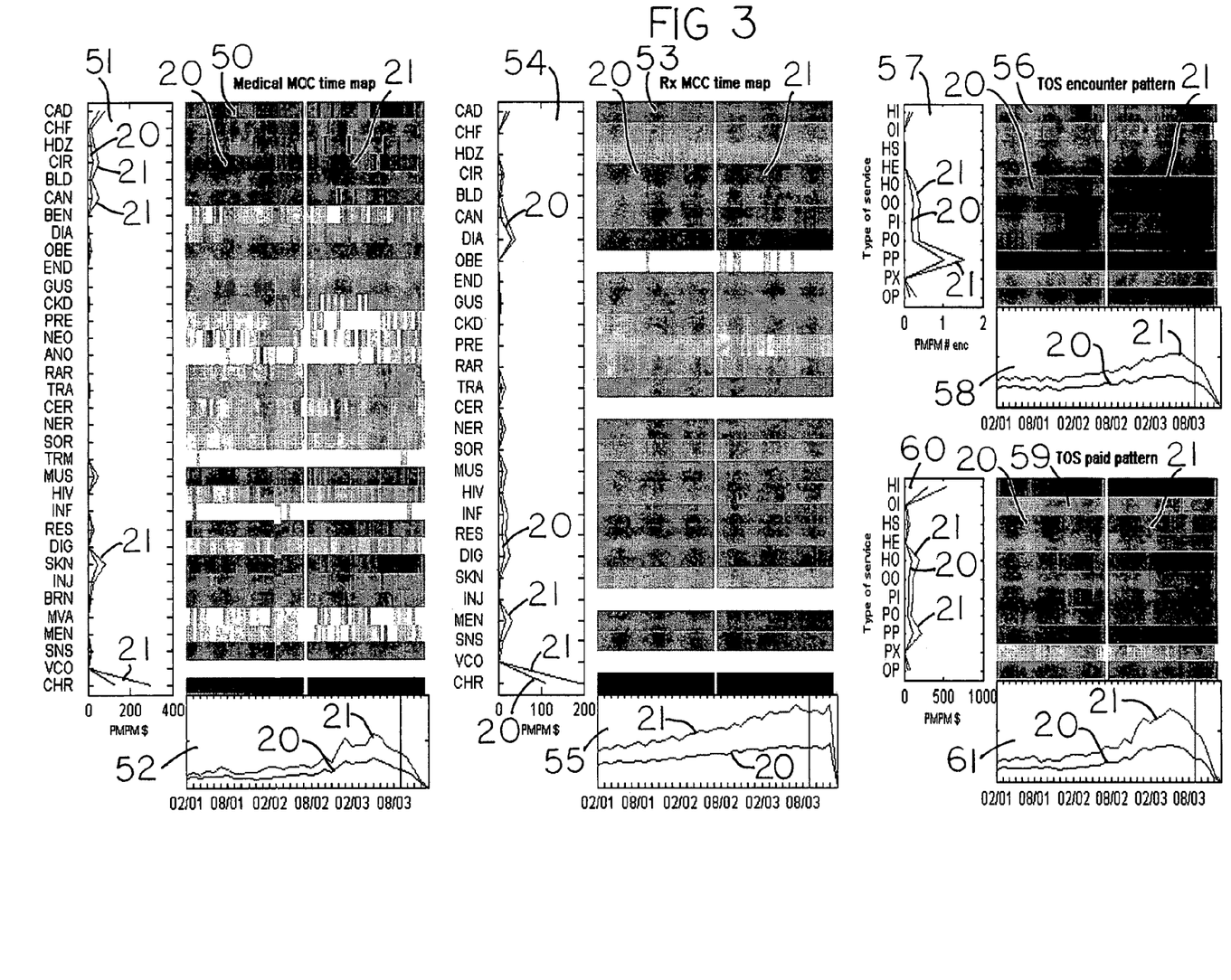
FIG. 3 shows group-level rolled-up data for medical, pharmacy, and place-of-treatment or type-of-service (TOS) data for two different selected groups for comparison.

Additional group displays and comparisons are desired in advanced embodiments. For example, FIG. 3 shows group-level rolled-up data for medical, pharmacy, and place-of-treatment (POT) or type-of-service (TOS) data for two different selected groups 20 and 21 for comparison. As with FIG. 2, the data shown in FIG. 3 covers the period February 2001-January 2004.

Items 50, 51, and 52 show medical claim information for group 20 and 21. Item 50 display is similar to the item 30 display in FIG. 2. This is a display over time of the primary ICD9 information mapped to the MCC categories, but showing cumulative information for all members of groups 20 and 21, the group 20 information being shown on the left and the group 21 information being shown on the right of display item 30. The group 20 information shown in item 30 of FIG. 2 has been compressed for the display of FIG. 3 so that the data for group 20 can be shown adjacent to the data for group 21 for side by side comparison of the information displayed. Again, the darker the shade of gray, the more the cost. Item 51 parallels item 50 and shows the total amount per group 20 and group 21 per MCC over the total time period reflected in item 50. Item 52 reflects the total amount over all MCCs for each of group 20 and group 21 over the same time period.

As with the related display group of items 50, 51, and 52, items 53, 54, and 55 form a related display group. These items show pharmacy claim information for groups 20 and 21.

Items 56, 57, and 58 relate to types of services (TOS) received by groups 20 and 21. The TOS codes shown, HI, OI, HS, HE, HO, OO, PI, PO, PP, PX, and OP are the same as the POT codes previously explained. Item 56 shows the number of encounters over time for each of groups 20 and 21 by TOS code. Item 57 shows total encounters by group per TOS code for the time period of item 56. Item 58 shows the total encounters by group for all of the TOS codes combined over the same time period as in item 56.

Items 59, 60, and 61 are similar to items 56, 57, and 58, as they also show TOS information over time for each of groups 20 and 21. However, instead of showing information based on encounters, they reflect cost paid information.

Figure 4A:
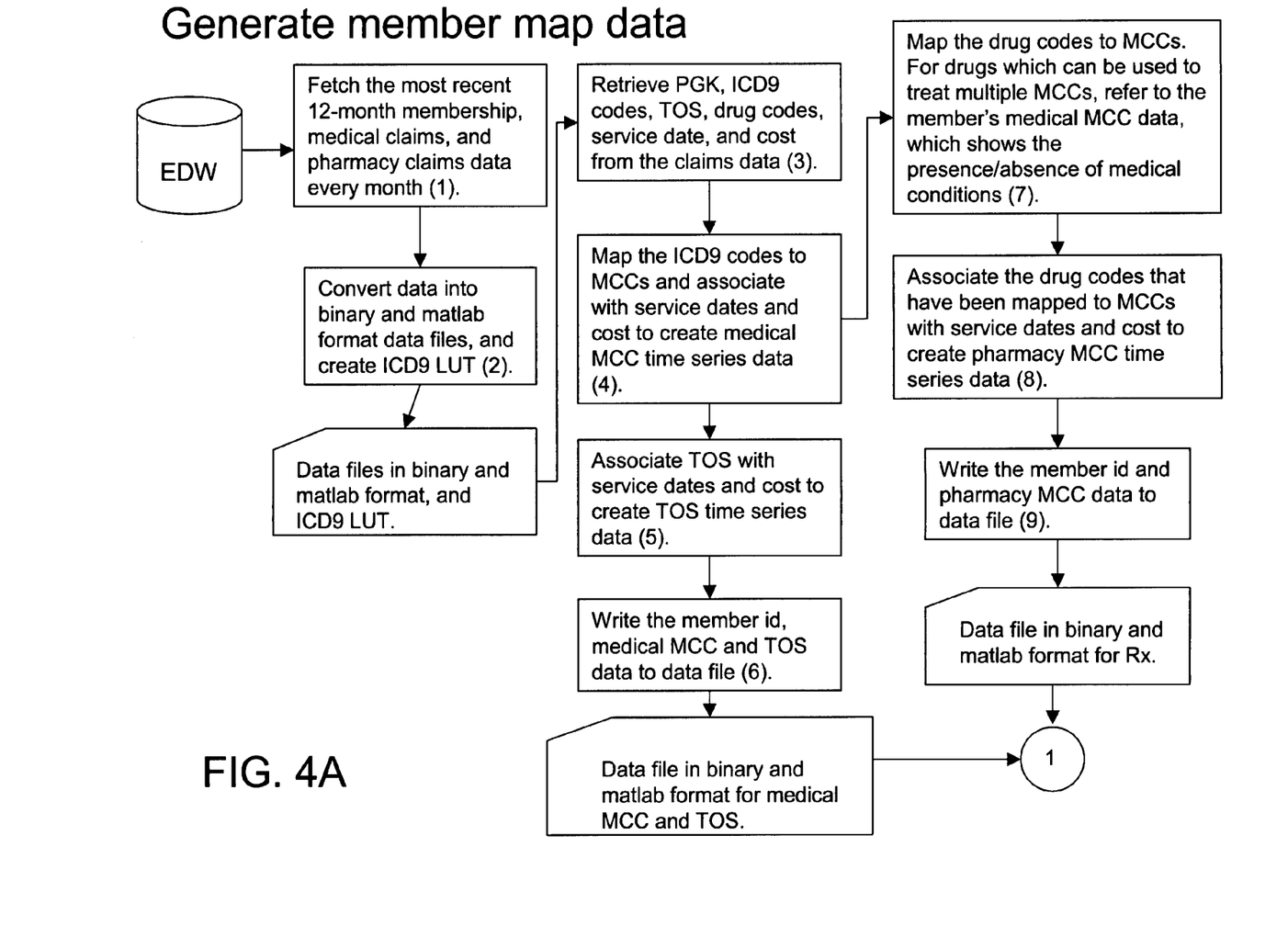
FIG. 4A is a flow chart of member map data generation.
Figure 4B:
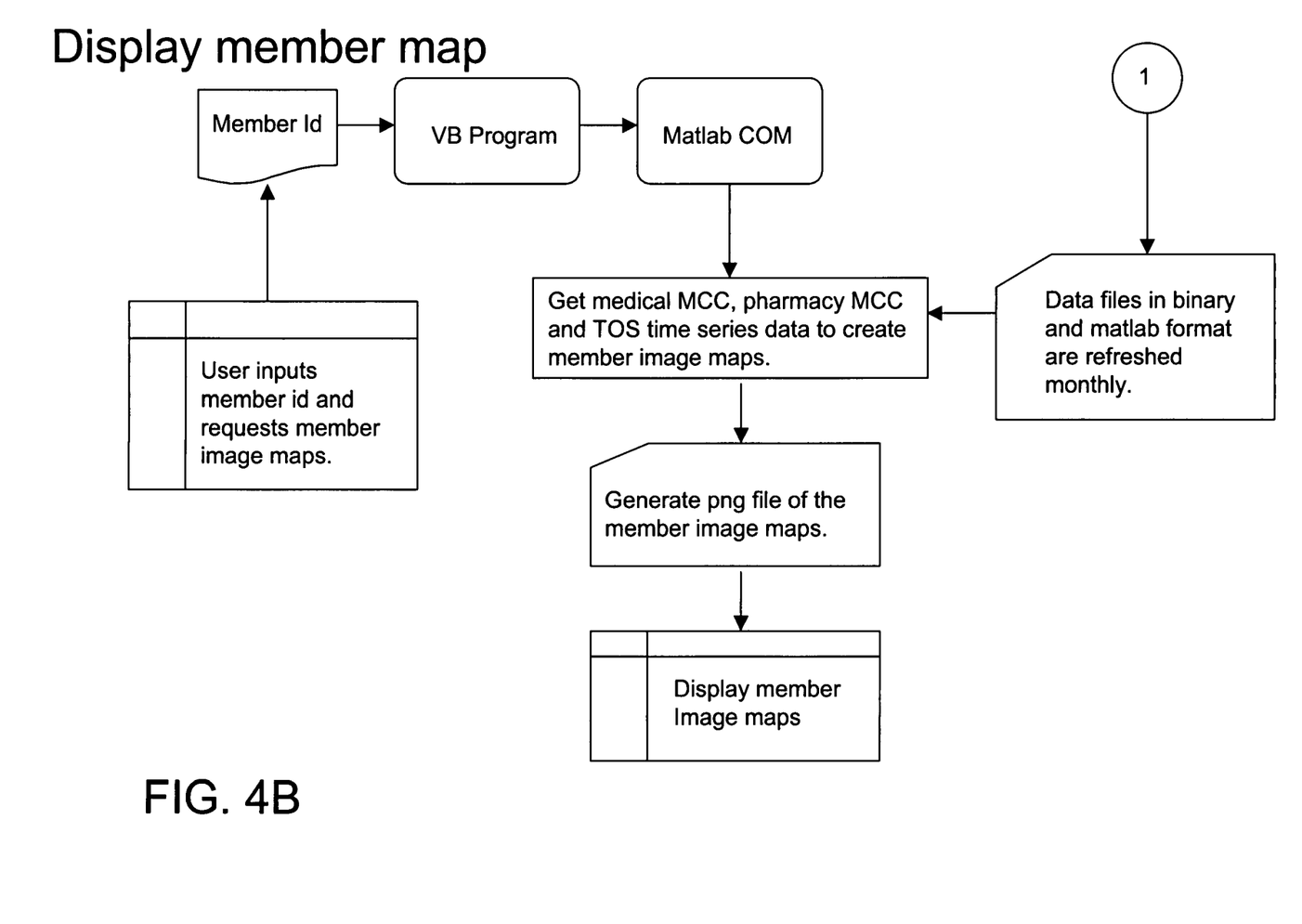
FIG. 4B is a flow chart showing how the data generated in FIG. 4A is used to create the various member and group displays.

FIG. 4A is a flow chart of member map data generation. FIG. 4B is a flow chart showing how the data generated in FIG. 4A is used to create the various member and group displays.

With reference to FIG. 4A, EDW is the Enterprise Data Warehouse where the medical, pharmacy, and member information is retained, for example, by an insurance company having members and processing medical and pharmacy claims. Some of the boxes in FIG. 4A have numbers in parenthesis. Those will be used in this added description.

(1) From the Enterprise Data Warehouse (EDW), we fetch the most recent one-year Rx and medical claims data for each active member at the end of each month. This process is repeated monthly.

(2) The raw relational database records are converted into all-numeric binary files for fast retrieval by computational engines. The string variables, such as ICD9 and other alpha-numeric codes, are also converted into numeric codes with each numeric code representing unique alphanumeric code in the code look-up table. Summary information (database field name, numeric data format for each field, and the number of records) along with string look-up tables (LUT) is stored in a Matlab format data file. For speed, create a numeric ICD9 LUT from the MCC codebook. It is noted that Matlab (MA-Trix Laboratory) is a high-level object-oriented, scientific programming language produced by the Mathworks in Natick, Mass. It has a number of built-in graphical visualization and scientific algorithms that facilitate rapid transition from concept formulation to prototyping. It also has real-time code generation capabilities that allow Matlab programs to be converted into embeddable and standalone applications through the use of C/C++ and Java compilers working in concert with Windows/Unix components. The embedded applications can be generated in Windows Common Object Model (COM) module or Dynamic Linked Library (DLL) that can be called from external programs written in Visual Basic (VB), C/C++, or Java. Matlab format is simply the way Matlab stores data in binary format, so Matlab can efficiently fetch data.

(3) Retrieve just the required fields from the binary claims data for speed and memory. PGK=person gen key, a unique identification assigned to each member.

(4) For each medical claim with up to nine ICD9's, perform numeric search, not string match, to find the corresponding MCC, sub-MCC, and sub-sub-MCC. Assign the associated cost to appropriate cells in the two-dimensional hierarchical MCC and time space. If there is more than one ICD9 (if there is only one ICD9, it is the primary ICD9 by definition), assign the first ICD9 to the primary MCC-time map with 80% of the total claim cost. Assign ICD9 2 through 9 (secondary ICD9) to the secondary MCC-time map with the remaining 20% equally distributed to the secondary ICD9's. For example, if a claim costing $10,000 has a primary ICD9 of congestive heart failure (CHF) and secondary ICD9's of coronary artery disease (CAD) and chronic obstructive pulmonary disease (COPD), the cost breakdown for CHF, CAD, and COPD will be $8,000, $1,000, and $1,000, respectively.

(5) Each claim with the TOS code is mapped onto an appropriate TOS-time cell. In this case, two separate TOS-time maps are created, representing utilization (# of hospital days or # of visits, such as emergency room, urgent-care center, and physician office visit) and cost.

(6) The TOS and MCC maps are written to a set of binary and matlab files for both storage efficiency and fast retrieval of member-specific maps later.

(7) Each Rx prescription is mapped to an appropriate MCC. If there is one-to-many mapping for drugs that can be prescribed to treat multiple MCC conditions, we refer to the medical MCC-time map for the member. We compare all the possible Rx MCC's with the appropriate medical MCC'S. If there is only one medical MCC present, then we assign the entire Rx cost to that MCC. If there are multiple matches, then we assign the Rx cost equally to the matched medical MCC'S.

(8) Assign the Rx MCC cost to the appropriate MCC-time cell.

(9) The Rx MCC-time map is written to a set of binary and matlab files.

At the bottom right of FIG. 4A, there is a number 1 in a circle. This links to FIG. 4B, showing how the medical MCC and TOS and pharmacy MCC data files are used to create the various member and group displays.

The Visual Basic (VB) program gets the input of the member id from the user and passes it to the Matlab COM, the Matlab COM generates an output portable network graphics or png file. The VB program then displays the image stored in the output file.

Inserting item numbers from FIGS. 1-3 as examples only, the present invention is for a method for automated extraction and display of past health care use data to aid in predicting future health status, comprising the steps of: a. accessing a database containing insurance claim information; b. mapping the insurance claim information by individual and claim to at least one of a set of major clinical conditions to create a plurality of MCC claim mappings; c. associating each MCC claim mapping with an individual identifier, a time identifier, and a cost identifier; and, d. creating at least one display (2, 3, 4, 30, 33, 50, 53) for at least one individual (1, 20, 21) showing, by each set of major clinical conditions (10) over a time period, a representation of the MCC claim mappings (13, 14), each MCC claim mapping being weighted by its respective cost identifier.

The step of mapping the insurance claim information can further include mapping by individual and claim to at least one of a set of place of treatment identifiers to create a plurality of POT claim mappings; the step of associating each MCC claim mapping with an individual identifier, a time identifier, and a cost identifier, can further include associating each MCC claim mapping to each POT claim mapping; and, the step of creating at least one display can further include creating an additional display (6, 39, 59) showing by each of the place of treatment identifiers over said time period a representation of the POT claim mappings, each POT claim mapping weighted by its respective cost identifier.

The step of creating at least one display can further include creating an additional display (5, 36, 56) showing by each of said place of treatment identifiers over said time period a representation of the POT claim mappings, each POT claim mapping weighted by a utilization identifier.

The step of mapping can include mapping primary diagnosis codes, secondary diagnosis codes, and/or pharmacy information contained in the insurance claim information to the set of major clinical conditions.

The display created can be a color display where different colors are used to identify different cost identifiers or a shades of gray display where different shades of gray are used to identify different cost identifiers.

The major clinical conditions may include hierarchical code levels, or sub or sub-sub levels, with mapping to the hierarchical code levels, where the step of creating at least one display includes providing the capability to expand the display to additionally show the MCC claim mappings by each of the set of major clinical conditions (10) and by any hierarchical code levels (11, 12).

The step of creating at least one display can create the display (2, 3, 4 of FIG. 1) for an individual (1), the display (30, 33 of FIG. 2) for a single group (20), or the display (50, 53 of FIG. 3) for multiple groups (20, 21).

Finally, the present invention is for a method for automated extraction of past health care use data to aid in predicting future health status, comprising the steps of: a. accessing a relational database containing available medical claim information, pharmacy claim information, and individual information; b. performing data conversion of said available medical claim information, pharmacy claim information, and individual information in said relational database to create a set of binary data and a related set of summarization data for fast retrieval of data; c. assigning ICD codes per medical claim to primary and secondary hierarchical MCC codes; e. assigning pharmacy claims to said primary and secondary hierarchical MCC codes; and f. assigning medical claims to POT categories in terms of utilization and cost.

The foregoing detailed description is given primarily for clearness of understanding and no unnecessary limitations are to be understood therefrom for modifications can be made by those skilled in the art upon reading this disclosure and may be made without departing from the spirit of the invention and scope of the appended claims.

What is claimed is:

1. A method for automated extraction and display of past health care use data to aid in predicting future health status, comprising the steps of:
   a. accessing a database containing insurance claim information;
   mapping said insurance claim information by a processor, said mapping comprising:
      i. mapping said insurance claim information by individual and claim to at least one of a set of major clinical conditions to create a plurality of MCC claim mappings;
      ii. mapping said insurance claim information by individual and claim to at least one of a set of place of treatment identifiers, based on the classification of submitter of said insurance claim information into place of treatment categories, to create a plurality of POT claim mappings;
   associating each MCC claim mapping with an individual identifier, a time identifier, and a cost identifier; where the step of associating each MCC claim mapping with an individual identifier, a time identifier and a cost identifier, further includes associating each MCC claim mapping to each POT claim mapping; and
   d. creating at least one display for at least one individual showing, by each of said set of major clinical conditions over a time period, a representation of the MCC claim mappings, each MCC claim mapping being weighted by its respective cost identifier.

2. The method of claim 1:
   b. where the step of creating at least one display further includes creating an additional display showing by each of said place of treatment identifiers over said time period a representation of the POT claim mappings, each POT claim mapping weighted by its respective cost identifier.

3. The method of claim 2, where the step of creating at least one display further includes creating an additional display showing by each of said place of treatment identifiers over said time period a representation of the POT claim mappings, each POT claim mapping weighted by a utilization identifier.

4. The method of claim 1, where the step of mapping includes mapping primary diagnosis codes contained in said insurance claim information to said set of major clinical conditions and where the step of creating at least one display includes creating a first display for at least one individual showing by each of said set of major clinical conditions over said time period said mapping of said primary diagnosis codes.

5. The method of claim 4, where the step of mapping includes mapping pharmacy information contained in said insurance claim information to said set of major clinical conditions and where the step of creating at least one display includes creating a second display for at least one individual showing by each of said set of major clinical conditions over said time period said mapping of said pharmacy information.

6. The method of claim 4, where the step of mapping includes mapping secondary diagnosis codes contained in said insurance claim information to said set of major clinical conditions and where the step of creating at least one display includes creating a second display for at least one individual showing by each of said set of major clinical conditions over said time period said mapping of said secondary diagnosis codes.

7. The method of claim 5, where the step of mapping includes mapping secondary diagnosis codes contained in said insurance claim information to said set of major clinical conditions and where the step of creating at least one display includes creating a third display for at least one individual showing by each of said set of major clinical conditions over said time period said mapping of said secondary diagnosis codes.

8. The method of claim 7:
   a. where the step of associating each MCC claim mapping with an individual identifier, a time identifier, and a cost identifier, further includes associating each MCC claim mapping to each POT claim mapping; and
   b. where the step of creating at least one display further includes creating an additional display showing by each of said place of treatment identifiers over said time period a representation of the POT claim mappings, each POT claim mapping weighted by its respective cost identifier.

9. The method of claim 8, where the step of creating at least one display further includes creating an additional display showing by each of said place of treatment identifiers over said time period a representation of the POT claim mappings, each POT claim mapping weighted by a utilization identifier.

10. The method of claim 1, where the step of mapping includes mapping pharmacy information contained in said insurance claim information to said set of major clinical conditions and where the step of creating at least one display includes creating a first display for at least one individual showing by each of said set of major clinical conditions over said time period said mapping of said pharmacy information.

11. The method of claim 1, where in the step of creating at least one display, a color display is created where different colors are used to identify different cost identifiers.

12. The method of claim 1, where in the step of creating at least one display, a shades of gray display is created where different shades of gray are used to identify different cost identifiers.

13. The method of claim 1, where in the step of mapping, at least one of said at least one of a set of major clinical conditions includes hierarchical code levels and where the step of creating at least one display includes providing the capability to expand the display to additionally show the MCC claim mappings by each of said set of major clinical conditions and by any hierarchical code levels.

14. The method of claim 1, where in the step of creating at least one display, said at least one display is created for at least one group comprising a plurality of individuals.

15. The method of claim 14, where the step of creating at least one display includes creating an additional display showing, by each of said major clinical conditions, a total monetary claim amount for said time period.

16. The method of claim 14, where the step of creating at least one display includes creating an additional display showing, for all of said major clinical conditions, a total monetary claim amount over said time period.

17. The method of claim 14, where in the step of creating at least one display, said at least one display is created for at least two groups, each group comprising a plurality of individuals, where said at least one display depicts the MCC claim mappings for each group on the same display.

18. The method of claim 1, where in the step of creating at least one display, said at least one display is created for an individual.

* * * * *

UNITED STATES PATENT AND TRADEMARK OFFICE
CERTIFICATE OF CORRECTION

PATENT NO.        : 7,676,379 B2                                                                          Page 1 of 1
APPLICATION NO.   : 10/832915
DATED             : March 9, 2010
INVENTOR(S)       : David H. Kil et al.

It is certified that error appears in the above-identified patent and that said Letters Patent is hereby corrected as shown below:

Column 4, line 44, in the middle of the line, after "OTHR=", change "sum" to "sub";

Column 9, line 15, after "OTHR=", change "sum" to "sub";

Column 17, line 9, insert --b.-- at the beginning of the line; and

Column 17, line 21, insert --c.-- at the beginning of the line.

Signed and Sealed this

Seventh Day of December, 2010

David J. Kappos
*Director of the United States Patent and Trademark Office*